3,611,676
PROCESS FOR THE SEPARATION OF
GAS MIXTURES
Gilbert Christen, Lyon, and Marcel Lefort, Caluire,
Rhone, France, assignors to Rhone-Poulenc S.A., Paris,
France
No Drawing. Filed Feb. 11, 1969, Ser. No. 798,468
Claims priority, application France, Feb. 12, 1968,
139,541
Int. Cl. B01d 59/12
U.S. Cl. 55—16     3 Claims

ABSTRACT OF THE DISCLOSURE

Membranes made of vinyltrialkylsilane polymers are useful for the separation of gaseous mixtures by selective diffusion of the mixture therethrough.

---

The present invention relates to the separation of gas mixtures by diffusion through membranes.

Membranes consisting of synthetic polymers have already been employed for the separation of gases. Depending upon the composition of the gas which it is desired to obtain, membranes consisting of polyethylene, polycarbonate, polyvinyl chloride or other organic polymers, or of organopolysiloxane elastomers have been employed.

It is known that the desired qualities of a membrane are, on the one hand, its permeability, i.e. its ability to allow the diffusion of the largest possible quantity of the gas which it is desired to separate, and on the other hand its selectivity, i.e. its ability to allow the diffusion of one gas in preference to others. The selectivity of a membrane in the separation of a mixture of two gases may be measured by the ratio of the permeability of the membrane to the first gas to the permeability of the membrane to the second gas.

It is also known that membranes consisting of organosilicon elastomers possess a distinctly greater permeability than organic polymers, but that this permeability is generally not sufficiently selective for practical use.

It has now been found that membranes consisting of vinyltrialkylsilane polymers may be employed with advantage for the separation of gas mixtures.

The invention therefore provides a process for the separation of a gas mixture into two components, one enriched in at least one constituent of the said mixture and the other impoverished in the same constituent or constituents, which process comprises bringing the said mixture into contact with a membrane of a vinyltrialkylsilane polymer, and allowing part of the said mixture to pass therethrough.

By "vinyltrialkylsilane" is meant a compound of the formula:

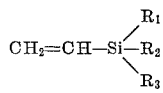

in which the symbols $R_1$, $R_2$ and $R_3$, which are identical or different, represent alkyl radicals preferably having from 1 to 4 carbon atoms. As examples of such compounds, there may be mentioned more particularly vinyltrimethylsilane, vinyldimethylethylsilane and vinyldimethylpropylsilane.

Various processes for obtaining polymers from vinyltrialkylsilane have been described in the literature, from Cason et al. (J. Org. Chem. 19, 1278–1282) to Nametkine et al. [Doklady Akadem. Naouk, 166, (5) 118 (1966)], who obtained polymers of high molecular weight capable of being converted into films. The polymers employed in this invention have an intrinsic viscosity, measured at 25° C. in cyclohexane, of more than 100 cc./g. The polymer is preferably prepared by polymerisation of the monomer in the presence of an anionic catalyst such as metallic lithium or an organometallic compound (ethyllithium or butyllithium), more particularly under the conditions described in the article by Nametkine et al. mentioned above.

After completion of the purifying treatments e.g. (filtration, washing and drying), the polymer is converted into a film by known techniques. The thickness of the film varies in accordance with the desired results. Generally, it is between $1\mu$ and $500\mu$.

The film is generally obtained by evaporation of a solution of the polymer optionally containing stabilisers and/or plasticisers, followed if desired by stretching of the film obtained.

To prepare this solution, the polymer is dissolved in an appropriate solvent, such as an aliphatic hydrocarbon (hexane, or heptane), a cycloaliphatic hydrocarbon (cyclohexane), an aromatic hydrocarbon (benzene, or toluene), or a chlorinated solvent (carbon tetrachloride, chloroform, or chlorobenzene). It may be advantageous to stabilise and/or plasticise the film, in which case there is employed a solvent for the polymer in which the stabiliser and/or the plasticiser is/are soluble and the stabiliser and/or plasticiser is/are incorporated in this solvent or in the solution of the polymer.

As stabiliser, there may be employed the compounds usually employed with organic polymers, such as 1,1-bis(2-methyl-4-hydroxy - 5-tert. - butylphenyl)butane, $\beta$-phenylnaphthylamine, octadecyl ester of $\beta$-(3,5-di-t.butyl-4-hydroxyphenyl)propionic acid, or 5-t. butyl-2-methyl-4-hydroxyphenyl sulphide.

The proportion of stabiliser may vary from 0.1% to 5% calculated on the weight of the dry polymer. If desired, there may be associated with the stabiliser a synergistic agent such as 2-octadecyloxycarbonylethyl sulphide or 2-dodecyloxycarbonylethyl sulphide in the same proportions as the stabiliser.

As plasticiser, there may be employed a compound such as dioctyl phthalate or dioctyl azelate in a quantity which may reach 50% calculated on the weight of the dry polymer. The quantity is however, generally between 10% and 30% by weight.

With regard to the concentration of the polymer solution (not including the other adjuvants), it may vary within wide limits and may reach, for example, 50%. Generally speaking, it is of the order of 10–30% when the film is produced by casting.

The solvent is then eliminated at ambient temperature and/or by heating, in the air or in the absence of air, under normal pressure or under reduced pressure.

These films may be employed without further treatment or they may be stretched, the stretching having the object of reducing the thickness of the film while enhancing the mechanical properties, notably the elongation at break. More particularly, a multi-axial stretching may be effected, for example by means of the apparatus described in French Pat. No. 1,524,375. Generally speaking, the stretching is carried out at a relatively high temperature (at least 200° C.) and it is for this reason that a stabiliser may be incorporated in the solution of the polymer.

For the separation of gases by the process of the invention, the above described membranes may be used as they are or they may be associated with a porous support (such as paper), a woven support (glass or other fabric) or a non-woven support (e.g. a non-woven structure of glass or other material), which makes it possible to employ membranes of small thickness.

The process of the invention may be employed for the production of a mixture of increased or reduced carbon dioxide, oxygen, nitrogen or helium content, from a gaseous mixture containing two or more of the said gases one of the gaseous constituents being oxygen or nitrogen, and the gas which does not pass through the membrane is enriched in nitrogen or, if the initial mixture contains no nitrogen, in oxygen. The new process may also be used for increasing the oxygen content of gas mixtures containing nitrogen and oxygen fed to blast furnaces, and for the preliminary enrichment of air with oxygen in an oxygen/nitrogen separation by conventional methods of liquefaction followed by distillation. The process may also be employed in oxygenators comprising a membrane for medical uses, or may serve for the separation of helium. The new process is particularly interesting because of the high selectivity of polyvinyltrialkylsilane membranes.

The following example illustrates the invention.

EXAMPLE

A vinyltrimethylsilane polymer is prepared by the procedure for bulk polymerisation described by Nametkine et al. in Doklady Akadem. Naouk [166(5), 1118 (1966)].

In the following table, there are indicated:

The quantity of monomer employed (in grammes); the concentration of the monomer in the reaction medium $C_M$ (in mole/l.); the concentration of the catalyst in the reaction medium $C_C$ (in mole/l.); the duration of the polymerisation $D_P$ (in hours); the weight of the dry polymer obtained $M_P$ (in grammes); and the intrinsic viscosity of the polymer (cc./g.) measured at 25° C. in cyclohexane for a zero concentration $[\eta]C=0$.

| | $(CH_3)_3ViSi$ (g.) | Moles/l. | | $D_P$ (hrs.) | $M_P$ (g.) | $[\eta]$ C=0 (cc./g.) |
| | | $C_M$ | $C_C$ | | | |
|---|---|---|---|---|---|---|
| Experiment: | | | | | | |
| A | 1 400 | 7 | $1.4 \times 10^{-3}$ | 435 | 1,070 | 148 |
| B | 1 400 | 7 | $1.4 \times 10^{-3}$ | 340 | 830 | 144 |
| C | 1 400 | 7 | $1.4 \times 10^{-3}$ | 350 | 760 | 147 |

Various solutions are prepared from the polymers of experiments A, B and C, these solutions having the following compositions:

Solution *a*: polymer A in 20% solution in cyclohexane;
Solution *b*: polymer A in 19% solution in chlorobenzene, 0.5% by weight calculated on the polymer of 1,1-bis(2-methyl-4-hydroxy-5-tert. butylphenyl)butane and 0.5% calculated on the polymer of octadecyl-2-oxycarbonylethyl sulphide;
Solution *c*: polymer B in 20% solution in cyclohexane;
Solution *d*: polymer C in 15% solution in chlorobenzene, 1% calculated on the weight of the polymer of an antioxidising agent containing phosphors, marketed under the trade name "Mark Q 158";
Solution *e*: identical to solution *d* +15% of dioctyl azelate calculated on the weight of the polymer;
Solution *f*: identical to solution *d* +15% of dioctyl phthalate calculated on the weight of the polymer.

These solutions are cast as films of variable thickness on a glass plate. The films are dried for 2 hours in the air at ambient temperature and then for 1 hour at 70° C. The films are then stripped from the glass plate, and some specimens are subjected to a multi-axial stretching at 230° C.

The membranes thus obtained are tested for permeability to various gases. To determine this permeability, the membrane is gripped in a measuring cell: the upstream side of the membrane, which is mounted on a porous metallic support, is subjected to a pressure increase and the rate of flow of gas is measured on the downstream side by following the displacement of a mercury indicator in a calibrated capillary.

The permeability constant of the membrane to a given gas may be defined as the quantity of gas (in cubic centimetres) under normal temperature and pressure conditions, which passes through a membrane 1 cm. thick per square centimetre of surface of the membrane, per second and for a pressure difference of 1 cm. Hg between the upstream and downstream sides of the membrane.

The following table indicates for each test:

The starting solution; the thickness of the membrane; the permeability constant to $CO_2$, $O_2$ and $N_2$ and, for some specimens, to helium; the ratio of the $O_2$ permeability constant/$N_2$ permeability constant; by way of comparison, the permeability constant to $CO_2$, $O_2$ and $N_2$ and the ratio of the $O_2$ permeability constant/$N_2$ permeability constant of membranes consisting of:

(1) An organopolysiloxane elastomer vulcanisable at ambient temperature, obtained from hydroxylated dimethylpolysiloxane oil having a viscosity of 19,000 cst. at 25° C. (100 g.); methyltriacetoxysilane (4 g.); silica of combustion having a large specific surface, "Aerosil" brand (25 g.); and diatomaceous silica, "Celite Superfloss" brand (25 g.).

(2) High-density polyethylene
(3) Polyvinyl chloride
(4) Polycarbonate.

| Polymer | Thickness of the membrane | $CO_2$ perm. const. | $O_2$ perm. const. | $N_2$ perm. const. | He perm. const. | $O_2$ perm. const./$N_2$ perm. const. |
|---|---|---|---|---|---|---|
| Starting solution: | | | | | | |
| a .... Polyvinyltrimethylsilane | Unstretched: 250μ | $12.5 \times 10^{-9}$ | $4.45 \times 10^{-9}$ | $0.97 \times 10^{-9}$ | $16 \times 10^{-9}$ | 4.5 |
| a .... do | Unstretched: 48μ | $15 \times 10^{-9}$ | $7 \times 10^{-9}$ | $1.6 \times 10^{-9}$ | $12.5 \times 10^{-9}$ | 4.35 |
| b .... do | Stretched ×3: 110μ | $9 \times 10^{-9}$ | $3.10 \times 10^{-9}$ | $0.62 \times 10^{-9}$ | $11.7 \times 10^{-9}$ | 5.1 |
| c .... do | Stretched ×3.5: 53μ | $18 \times 10^{-9}$ | $6.1 \times 10^{-9}$ | $1.48 \times 10^{-9}$ | | 4.1 |
| d .... do | Stretched ×2: 140μ | $8.6 \times 10^{-9}$ | $2.55 \times 10^{-9}$ | $0.54 \times 10^{-9}$ | | 4.7 |
| d .... do | Stretched ×3.5: 80μ | $6.5 \times 10^{-9}$ | $2.0 \times 10^{-9}$ | $0.46 \times 10^{-9}$ | | 4.3 |
| d .... do | Stretched ×5: 70μ | $5.25 \times 10^{-9}$ | $1.86 \times 10^{-9}$ | $0.45 \times 10^{-9}$ | | 4.2 |
| e .... do | Unstretched: 275μ | $14.25 \times 10^{-9}$ | $4.0 \times 10^{-9}$ | $1.0 \times 10^{-9}$ | | 4 |
| f .... do | Unstretched: 255μ | $9.95 \times 10^{-9}$ | $2.90 \times 10^{-9}$ | $0.52 \times 10^{-9}$ | | 5.6 |
| Test: | | | | | | |
| 1 .... Organopolysiloxane elastomer | | $303 \times 10^{-9}$ | $60 \times 10^{-9}$ | $30 \times 10^{-9}$ | $35 \times 10^{-9}$ | 2.0 |
| 2 .... Polyethylene | | $0.43 \times 10^{-9}$ | $0.11 \times 10^{-9}$ | $0.033 \times 10^{-9}$ | | 3.3 |
| 3 .... Polyvinyl chloride | | $0.10 \times 10^{-9}$ | $0.012 \times 10^{-9}$ | $0.004 \times 10^{-9}$ | | 3 |
| 4 .... Polycarbonate | | $0.85 \times 10^{-9}$ | $0.20 \times 10^{-9}$ | $0.03 \times 10^{-9}$ | | 6.6 |

As is apparent from this table, the membranes employed in the process of the invention have a higher permeability constant than the membranes of the exemplified organic polymers used for comparison (tests 2, 3 and 4). Polyvinyltrimethylsilane membranes are less permeable than organopolysiloxane elastomer membranes, but are distinctly more selective.

Apparatus for the separation of gaseous mixtures by diffusion through a selectively permeable membrane, in which the said membrane is made of a vinyltrialkylsilane polymer as described above, is within the scope of the invention.

We claim:

1. In a process using a membrane of an organo-silicon polymer to separate a gas mixture into a first part which is enriched in at least one component of said gas mixture and a second part which is enriched in a different component or components of said gas mixture, said gas mixture being selected from the group consisting of mixtures of (a) oxygen and nitrogen, (b) helium and oxygen, (c) helium and nitrogen, and (d) mixtures of helium, oxygen and nitrogen, the improvement which comprises bringing said gas mixture into contact with a membrane of a vinyltrialkylsilane polymer and allowing a component of said gas mixture to pass through said membrane, whereby improved selectivity of at least one component of said gas mixture is obtained.

2. Process according to claim 1 in which the said polymer contains a plasticiser.

3. Process according to claim 1 in which the said polymer membrane has been stretched.

References Cited
UNITED STATES PATENTS 3,303,105 2/1967 Konikoff et al. _____ 55—16 X
3,510,387 5/1970 Robb _____ 55—16 X REUBEN FRIEDMAN, Primary Examiner C. N. HART, Assistant Examiner